Jan. 25, 1955 R. W. BROWN 2,700,458
PROTECTIVE CONTAINER
Filed Oct. 28, 1949 10 Sheets-Sheet 1
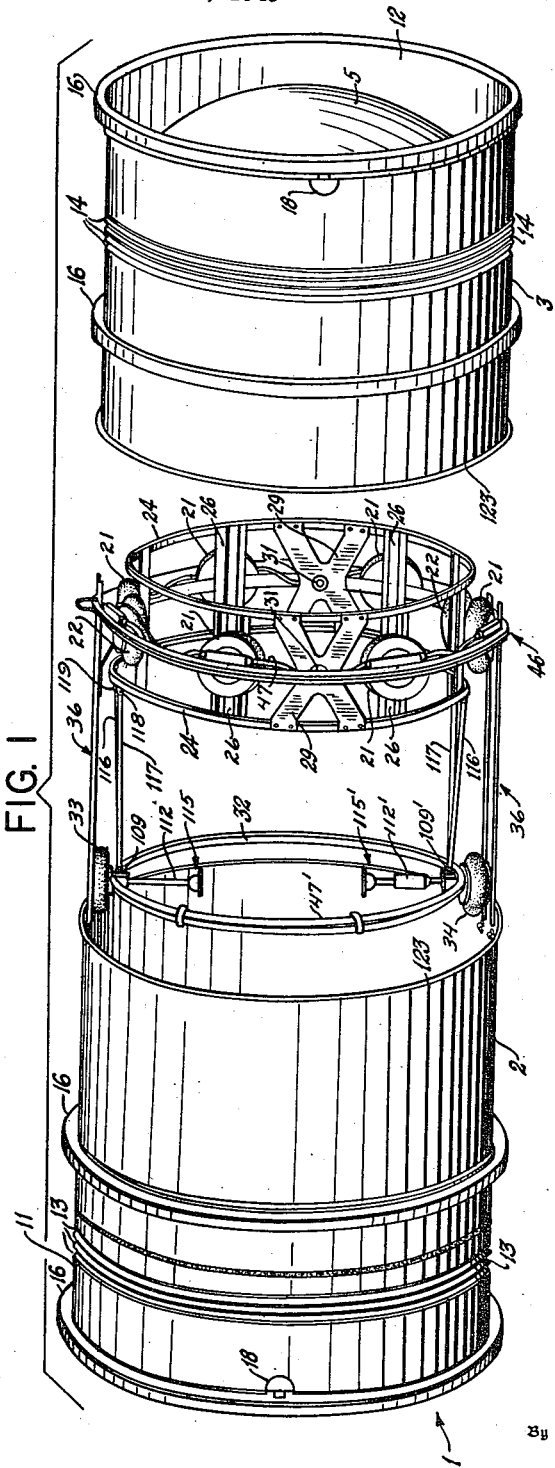
Inventor
ROY W. BROWN
Attorneys Jan. 25, 1955
R. W. BROWN
2,700,458
PROTECTIVE CONTAINER
Filed Oct. 28, 1949
10 Sheets-Sheet 2
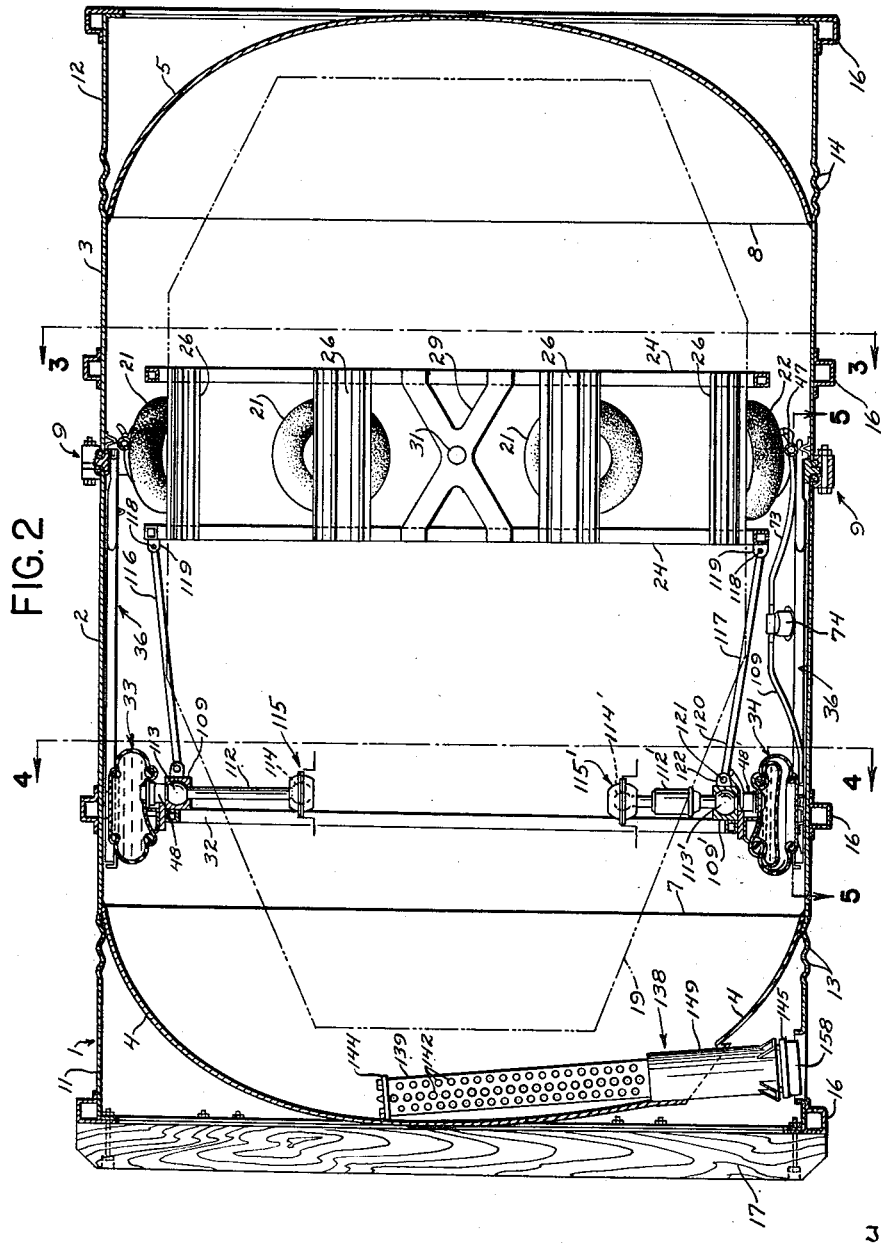
Inventor
ROY W. BROWN
By Ely & Frye
Attorney Jan. 25, 1955     R. W. BROWN     2,700,458
PROTECTIVE CONTAINER
Filed Oct. 28, 1949                                    10 Sheets—Sheet 3
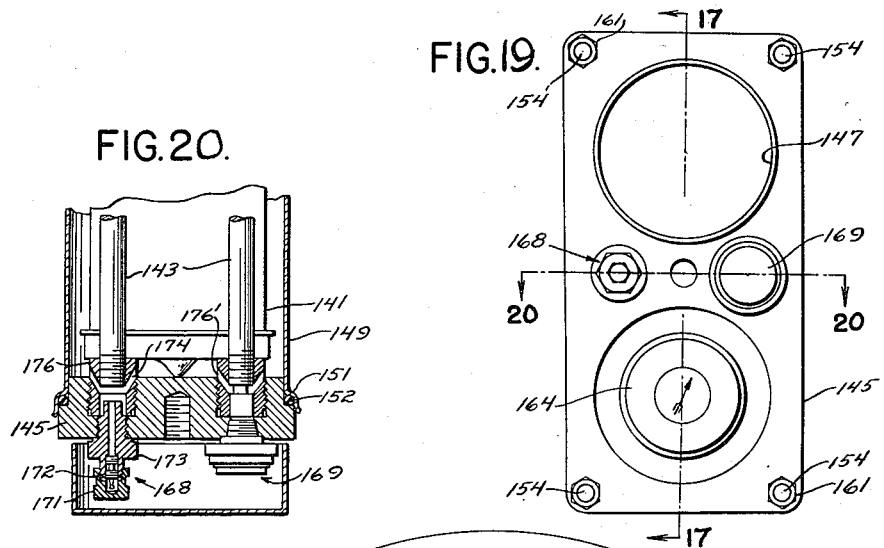
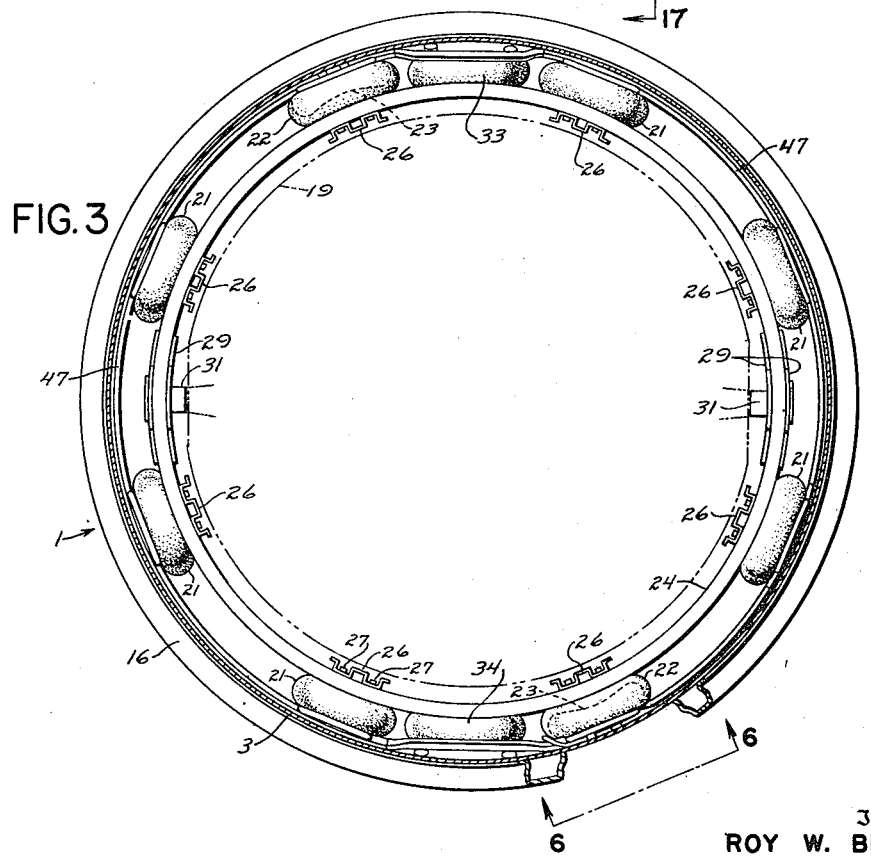
Inventor
ROY W. BROWN
Attorneys Jan. 25, 1955  R. W. BROWN  2,700,458
PROTECTIVE CONTAINER
Filed Oct. 28, 1949  10 Sheets-Sheet 4
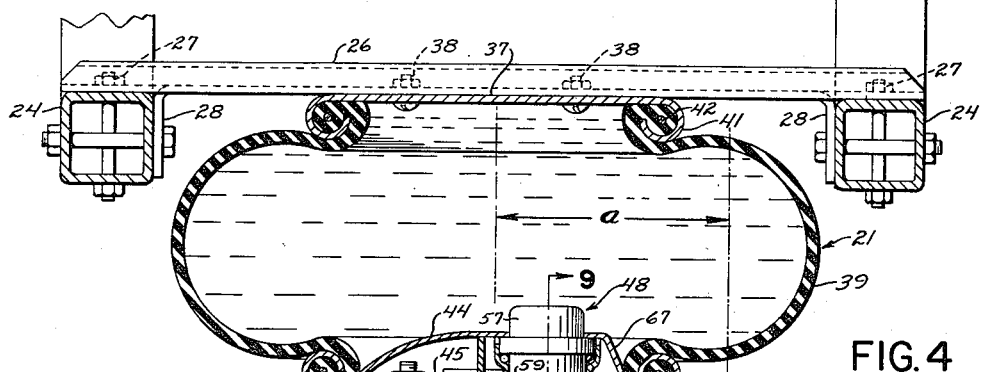
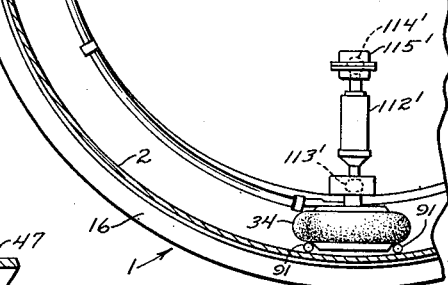
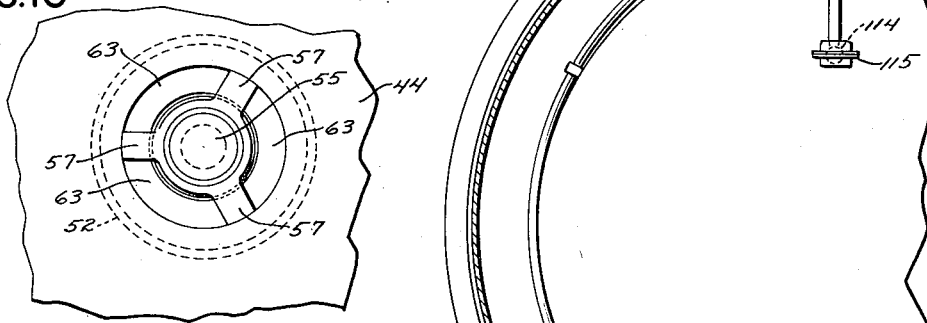
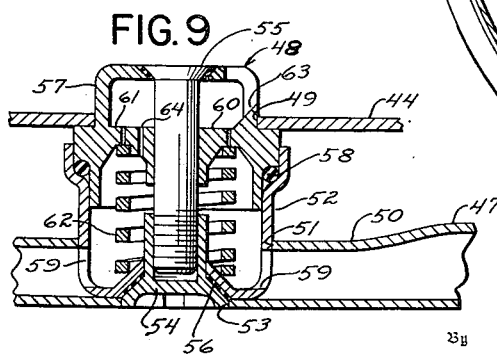
Inventor
ROY W. BROWN
Attorneys Jan. 25, 1955    R. W. BROWN    2,700,458
PROTECTIVE CONTAINER
Filed Oct. 28, 1949    10 Sheets-Sheet 5
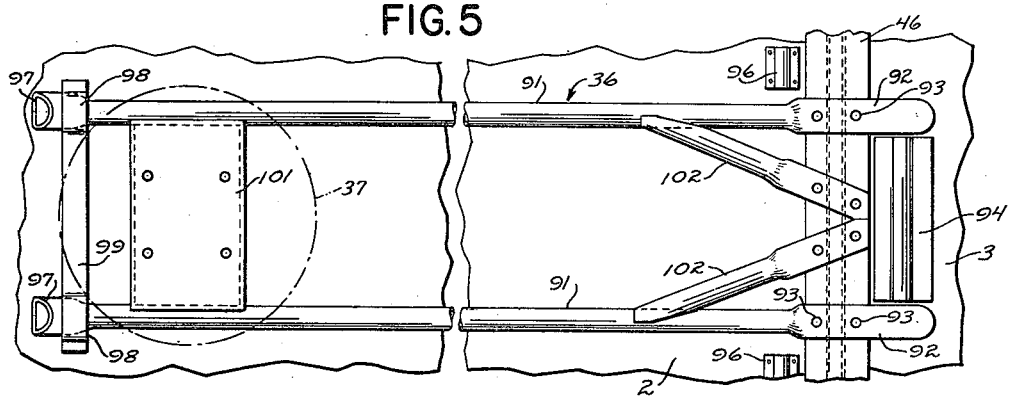
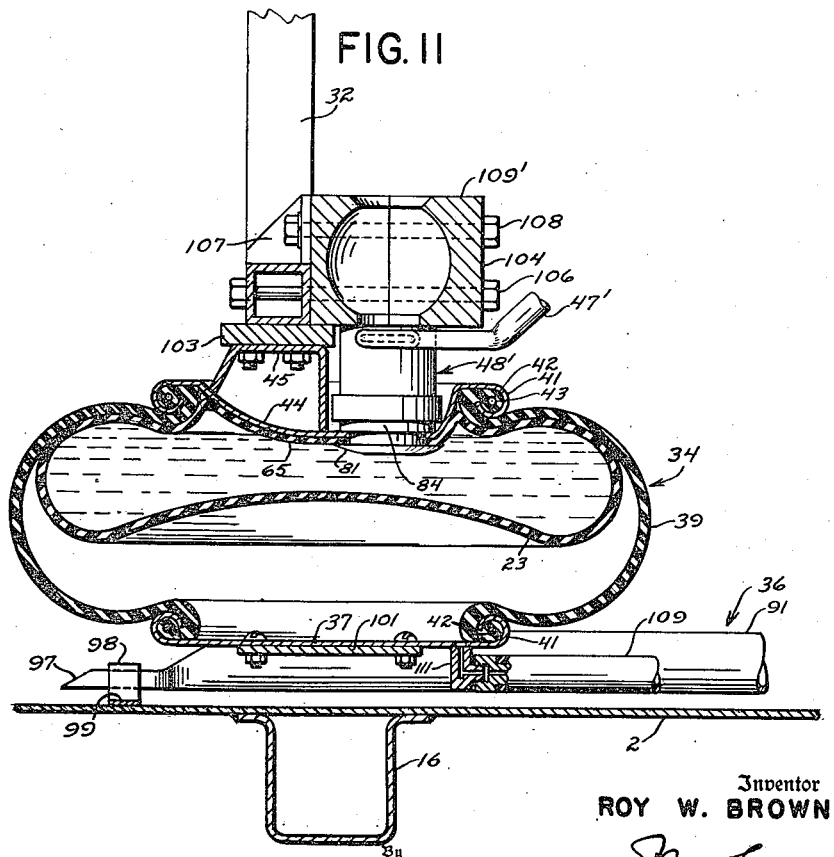
Inventor
ROY W. BROWN
Attorneys Jan. 25, 1955   R. W. BROWN   2,700,458
PROTECTIVE CONTAINER
Filed Oct. 28, 1949   10 Sheets-Sheet 6
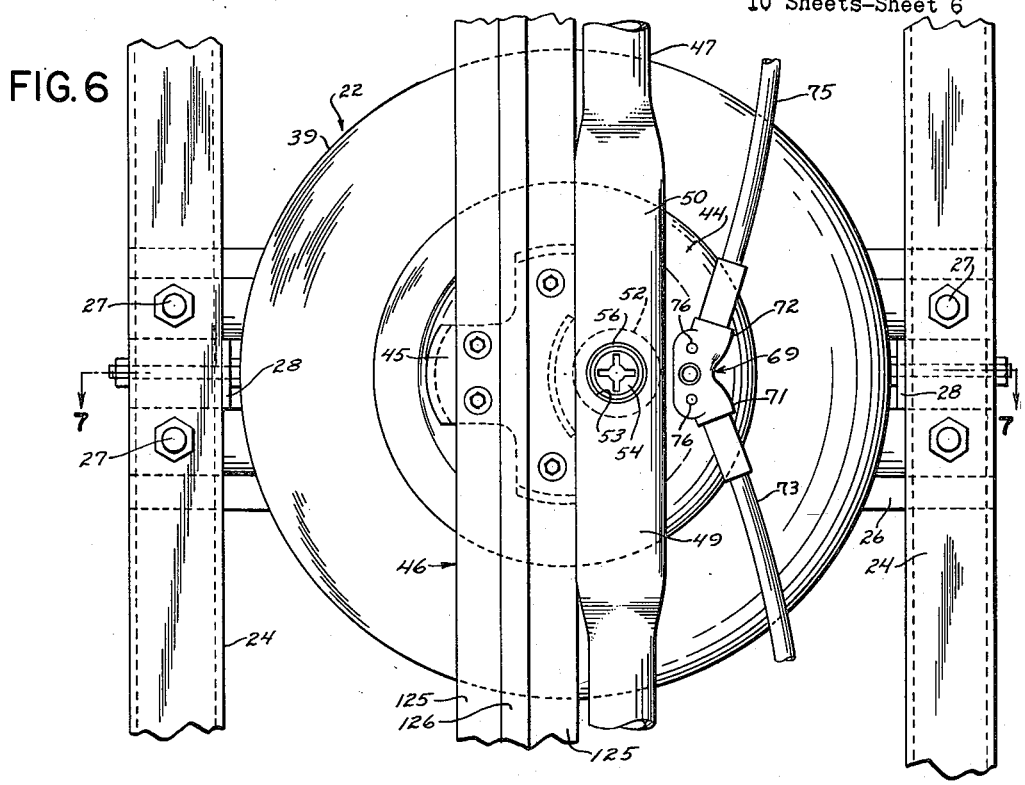
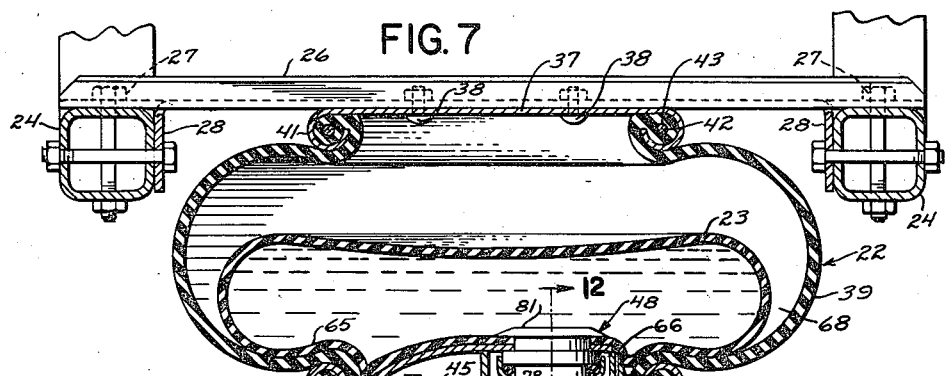
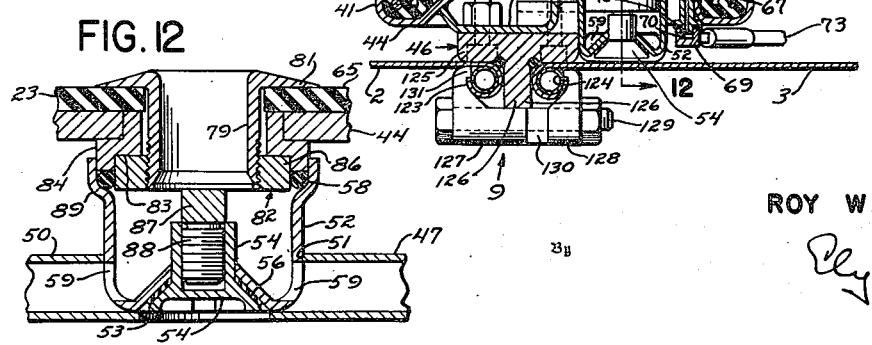
Inventor
ROY W. BROWN
Attorneys Jan. 25, 1955   R. W. BROWN   2,700,458
PROTECTIVE CONTAINER
Filed Oct. 28, 1949   10 Sheets-Sheet 7

Inventor
ROY W. BROWN
By
Ely & Frye
Attorneys

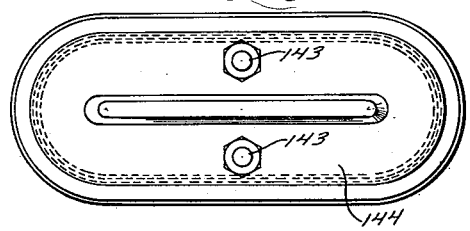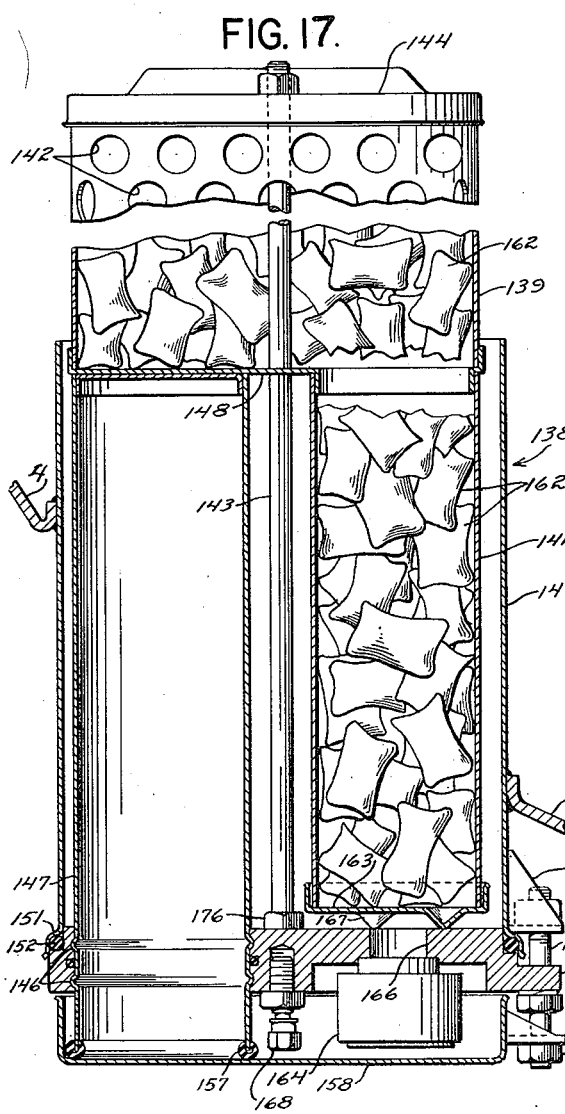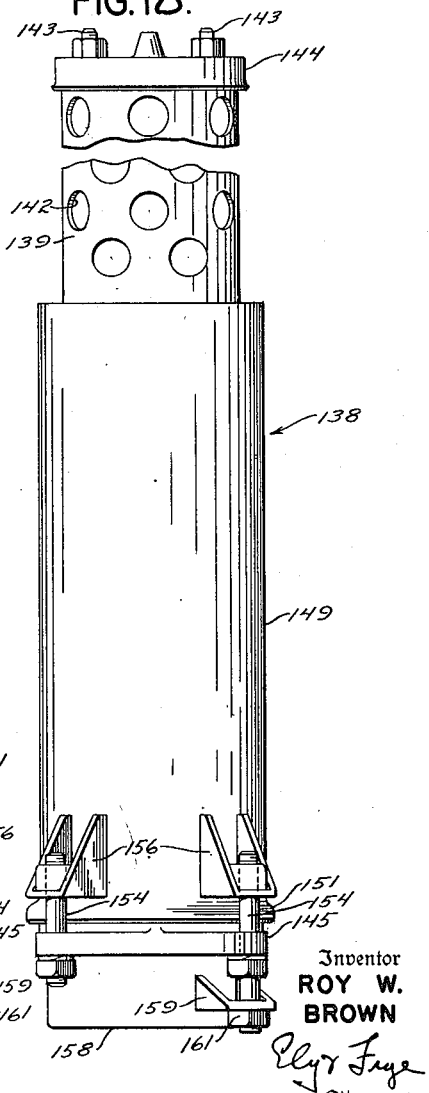

Inventor
ROY W. BROWN
Attorney

Jan. 25, 1955 R. W. BROWN 2,700,458
PROTECTIVE CONTAINER
Filed Oct. 28, 1949 10 Sheets-Sheet 10

Inventor
ROY W. BROWN

Ely & Frye
Attorneys

United States Patent Office 2,700,458
Patented Jan. 25, 1955

2,700,458

PROTECTIVE CONTAINER

Roy W. Brown, Akron, Ohio, assignor to The Firestone Tire & Rubber Company, Akron, Ohio, a corporation of Ohio Application October 28, 1949, Serial No. 125,143

4 Claims. (Cl. 206—46)

This invention relates to protective containers and, in particular, to containers having internal means for suspending complicated structures of high cost and high performance, such as aircraft engines and the like, whereby the shocks incident to shipping and handling may be absorbed with high efficiency, accompanied by favorable conditions of acceleration, vibration frequency and damping. This problem is one of particular importance in connection with long range shipping and long time storage, either of which may encounter extreme conditions of climate.

Specifications regarding the handling of various types of such packaged goods will vary among the different manufacturers and also among the various consumers. It is, therefore, an object of the invention to provide a container adapted to varying modes of handling or easily modifiable for such purpose.

It is a further requirement that packaged materials be safeguarded from deterioration due to atmospheric conditions and, therefore, it is a further object of the invention to provide a pressurized and dehydrated container which, in addition to fulfilling the aforesaid object, shall have a minimum of sealed areas so that the chance of leakage will be lessened, a further and related object being to house various accessories in a compact unit affording access to the contents from without the container without unduly increasing lines of possible leakage.

A further object is to provide a suspension for insertion in a container of the type described which shall mount the packaged article in a manner similar to its mounting in its normal employment.

Another object is to provide a mounting with load-carrying capacity concentrated in the region of the center of gravity of the packaged article.

One broad object is to provide for a cushioning means for a packaged object which will permit substantially universal movement of the object.

More particularly, it is an object to provide a shock absorbing structure combining liquid and air as a cushioning means in a novel manner and providing, selectively, for the absorption of energy under static or dynamic loading. Yet another object is to provide cushioning components in a container constructed and arranged in a manner to provide optimum pay load space and, further, to provide for the efficient absorption of high dynamic loads with minimum displacement.

Expressed generally, the invention comprises a system in which a heavy weight is suspended on a system of oil-bearing bellows and associated oil and air-bearing bellows, the latter acting both as an accumulator for the intercommunicating oil of the system and to carry the static load, and the former being provided with metering devices whereby a high efficiency of energy absorption is achieved under high values of dynamic loading with minimized load movement. These results are attained in a suspension which permits substantially universal movement of the load within the maximum permissible value.

For a detailed description of containers representative of the invention, reference is had to the accompanying specification, as illustrated in the drawings, in which:

Fig. 1 is an exploded view in perspective of a container and its associated suspension sling.

Fig. 2 is an axial sectional view of the assembled container and inner suspension with the container lying on its side.

Fig. 3 is a sectional view taken on the line 3—3 of Fig. 2.

Fig. 4 is a section taken on the line 4—4 of Fig. 2.

Fig. 5 is a view taken on the line 5—5 of Fig. 2.

Fig. 6 is an enlarged view of a bellows and mounting taken on the line 6—6 of Fig. 3.

Fig. 7 is a section taken on the line 7—7 of Fig. 6.

Fig. 8 is a view similar to Fig. 7 showing the other of the two types of bellows in the main suspension ring.

Fig. 9 is a valve detail, enlarged, taken on the line 9—9 of Fig. 8.

Fig. 10 is a top plan view of Fig. 9.

Fig. 11 is an enlarged view of the lower one of the two bellows of the front (leftward) suspension shown in section in Fig. 2.

Fig. 12 is an enlarged sectional view taken on the line 12—12 of Fig. 7.

Fig. 16 is an end view of an accessory unit for insertion in a container.

Fig. 17 is a section taken on the line 17—17 of Fig. 19.

Fig. 18 is a side view of Fig. 17.

Fig. 19 is a view of the bottom end of Fig. 17, with the cover removed.

Fig. 20 is a sectional view taken along the line 20—20 of Fig. 19.

Figs. 26, 27 and 28 are graphs of loading characteristics of various types of springs.

*The container*

Figure 13:
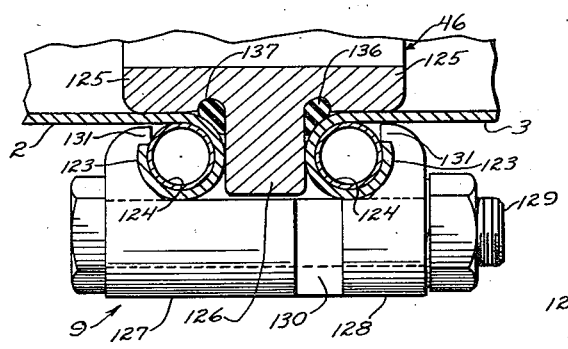
Fig. 13 is an enlarged detail in section of the connecting and sealing means for the two main sections of the container showing the T ring.

Referring to the drawings, there is shown in Fig. 1 a container indicated generally by the numeral 1. The shell of the container, which must be hermetically sealed for purposes of pressurizing and dehydrating, consists, in the illustration shown, of four major components: A cylindrical section 2, which may extend beyond the center of the container to accommodate the major part of the suspending means in a step prior to final assembly; a relatively shorter cylindrical section 3; and two opposite end domes or ellipsoidal heads 4 and 5. The latter, which are useful in one employment for ensuring that the container will not be set on end, are united in air-tight fashion at their peripheral edges 7, 8 to the cylindrical sections, as by welding, and the inner edges of the cylindrical sections 2, 3 are united in a mechanical locking device indicated generally by the numeral 9 and later to be described in detail.

In cases where it is desired, or not prohibited, that the container be stood on end, the cylindrical sections 2, 3 may be extended, as indicated at 11 and 12, respectively, so that the outer edges of the said sections extend beyond the outermost points on the domes 4, 5. These extensions are preferably formed, at least in part, with annular corrugations 13, 14 so that the extensions may deflect under loading, as when the container is accidentally tipped over, and thus provide a degree of resilience which will obviate damage.

Whenever permitted, rolling of containers is a convenient manner of transport and, for this purpose and to absorb impact and minimize abuse, hollow rings 16 of U section are welded to the outside of container. These all extend an equal distance outward of the container shell and beyond any other protuberance thereon, and form a ground contact for rolling.

When maintenance of the container on end at all times is required or desired, the bottom portion thereof (leftward in Fig. 2) is provided with skids 17 bolted to an inturned flange on the end of cylindrical portion 13 and, preferably, also to an inwardly extended flange of the U-ring 16 located at that end. For the lifting of such containers as must be handled in a vertical position, openings 18 are provided in cylindrical extension 12 at diametrically opposed points and serve for the reception of hoisting hooks, chains or the like. These openings may be provided at both ends if necessary or desirable.

The suspension system

To describe the suspension system generally, bellows type cushions are provided in an arrangement whereby one face of each, in the main suspension system, is attached to the inside of the container and the other face of each is attached to the packaged article so that all motion of the article is reflected in deformation of one or more of the bellows. In this role, the bellows are subject to deformations in a universal sense, partaking of motions either axially or transversely thereto, and deforming in torsion to some extent.

A plurality of such systems of bellows may be provided in a given container, or one such system may be employed in a location to receive the loads in a concentrated manner in a restricted area, with minor load cushioning devices otherwise distributed. In a preferred embodiment, the bellows system is based on a gas-liquid principle, certain of the units, under normal load, being filled with a liquid such as oil and others being wholly or partly filled with a gas such as air. In this system, the liquid-holding bellows are in communication with the gas-holding bellows, the gas itself being isolated and acting both as a cushion for the suspended load and an accumulator for the oil. Under sudden, high loads the cushioning is somewhat stiff but yields at predetermined maximum load values to flow from one oil bellows to others by means of a one-way metering device. Upon cessation of the abnormal load the original distribution of oil in the several bellows is restored without metering.

The main unit of the suspension system is arranged in circumferentially spaced relation in the area between the inside of the container 1 and the outer extent of the packaged object 19, the latter being indicated in general outline in broken lines and which may comprise such a heavy and delicate object as a power plant for aircraft. As shown, the ring of bellows forming the main suspension is positioned near the center of gravity of the article 19. Thus the article may be balanced, under static conditions, solely on this ring of bellows. Under dynamic conditions, the turning moments may be counteracted by cushioning systems of somewhat lower total capacity such as the system of two bellows shown in Fig. 4 and to the leftward of the center of the main suspension in Fig. 2.

The system of bellows at the center of gravity are eight in number (Fig. 3). Six of these, indicated each by the numeral 21, have a single main chamber filled with oil. The remaining two, indicated by the numeral 22—22 are partly filled with oil and have an isolated chamber portion, defined by a flexible partition 23, containing air under pressure, of the order of 5 p. s. i., designed to carry the static load. The construction of the individual bellows and their interconnections will later be described in detail.

The eight bellows of the main suspension are arranged equidistantly on a pair of rings 24 formed of hollow tubular stock substantially square in cross section. The rings 24 are connected in side-by-side spaced relation by longitudinally ribbed cross members 26, eight in number, which are bolted to the inner sides of the rings as at 27 (Fig. 7) and have depending flanges 28 bolted to the side faces of the rings. A pair of X-shaped cross members 29, spanning the rings at each of two diametrically opposite positions, have each a central bushed bore 31 which serves as a bearing for the usual mounting trunnions of an aircraft engine. Thus no strains are imposed on the engine structure other than those encountered in normal mounting in an aircraft.

The auxiliary suspension for the front of the engine comprises a ring-shaped hollow tube 32 (Figs. 2 and 4), to which the inner sides of the two bellows 33, 34 are attached, the entire front suspension being integrated with the main suspension, for simultaneous insertion into the container, by means of a pair of extensions indicated generally by the numeral 36 (Figs. 2 and 5) later to be described. Except for the manner of mounting, bellows 33 and 34 are identical, respectively, with bellows 21 and 22 of the main suspension.

Both types of bellows in the main suspension (Figs. 7 and 8) are carried on the system of rings 24 by base plates 37, which are bolted to the respective cross members 26 as at 38. The tire-shaped flexible wall 39 of each of these bellows, which is composed of rubber or rubberized fabric, preferably oil-resistant, is attached to the base plate 37 by means of a rolled rim 41 of the latter, which is turned into locking engagement with a circular bead 42 of the wall 39, the bead preferably reinforced as by a wire or cable 43. The opposite rim of the wall 39 has a similar, locked engagement with a cap plate 44. The latter has welded to a side portion of its outer face a T-shaped strap 45 which is bolted to a ring 46 of T-section to provide the outer attachment for the bellows. Ring 46 also forms part of the coupling means 9 of the sections of the container 1, as will be later explained, and the bolting of the various bellows to ring 46 is accomplished prior to such assembly of the container sections, as will be apparent from Fig. 1. The T-ring serves also to distribute all static and impact loads to the entire shell structure and provides a stiff concentric register for the shell edges when assembled and locked.

The type of suspension just discussed is susceptible of wide variation and thus adaptable to a variety of articles for shipping and storage. The number and relative location of bellows in either or both units of the suspension may be varied without substantial change in the basic structure; the relation of the auxiliary suspension to the main suspension may be varied within wide limits or it may be eliminated altogether.

The fluid system

As an overall description of the fluid connections among the several bellows in the main suspension mounted on rings 24, it may be briefly stated that there is communication among the oil-filled chambers of all the bellows and free communication between the two respective air-filled chambers of bellows 22, 22. The oil transfer is had by a pipe 47 (Fig. 3) communicating with each of the entire eight bellows and arranged on a circumferential line which, in this case, will lie just inside of the container shell 1.

The connection of pipe 47 with the metering valve shown generally at 48 will be apparent from Fig. 9. The valve is received in a circular opening 49 in the plate 44 and secured in place as by brazing. In the region of its attachment to the valves, the pipe 47 is flattened as at 50 and the flat portion has a large inner bore 51 closely fitted on an outer cup 52 of the valve housing and brazed thereto, and is brazed around the base of the cup 52 at the margin of a smaller, outer bore 53 in the pipe which is provided to accommodate a nut 54. The latter, together with a bevel-headed bolt 55 having a gasket 56, retains an inner cup 57 of the valve housing in assembled relation to cup 52, the assemblage being fluid-sealed by an O-ring 58. The flat pipe, when brazed in place, is thus fluid-sealed to the cup 52 to provide oil communication with ports 59 therein.

The valve head 60 has an axial bore by which it is received on the bolt 55 for sliding motion to permit metering of the fluid. The metering is controlled in part by an inner, annular flange 61 on the cup 57 through which the valve head passes with a loose, sliding fit. Motion of the valve head outward past the flange 61 is resisted by a spring 62, the innermost convolution of which abuts, by about half of its width, the flange 61, which thus forms a limit stop for expansion of the spring. The valve head, however, is free to move inwardly of the flange 61, and thus fluid from pipe 47 can move freely into the bellows, through the three ports 63 in the inner cup 57, if the pressure in the pipe exceeds that in the bellows. Reverse flow, that is outward from the bellows, is occasioned only when the fluid pressure in the bellows exceeds that in the pipe 47 by an amount sufficient to depress the spring 62. Since the deflection of the spring will depend upon the pressure differential, the rate of flow will vary with such differential. The metering characteristics may be modified by the amount of clearance between valve head 60 and flange 61, and/or by the provision of openings such as 64 through the valve head.

Outward flow due to loading occurs through the valves of those bellows lying below the axis of the suspension. In the valves of such lower bellows the valve head 60 will, in general, due to its weight, occupy its position of dwell on the spring in readiness for metering.

The air-oil bellows 22, 22 are mounted in a manner identical to that of the all-fluid bellows 21 and identical parts in the two types of bellows are indicated by similar reference characters. Structurally, they differ from the bellows 21 in having the partition 23 and an opening for passage of air, and in the fact that there is no hydraulic metering. Referring to bellows 22 shown in Fig. 7, the partition 23 has a portion 65 nesting with the cap plate 44 and with a portion of bellows wall 39, and is secured in a manner presently to be described. A nipple 66 is brazed in place in an opening in the steeply slanted portion 67 of the cap plate 44, in communication with the air chamber 68 of the bellows, and forms a means of charging air into the bellows for attaining the desired pressure. A coupling member 69 has a blind bore 70 communicating both with the bore of nipple 66 and with the bores of branches 71, 72 of the coupling. A flexible tube 73 is fitted on branch 71 and leads to the main air-charging valve, the housing 74 of which (Fig. 2) is fixed in an opening of the container 1, and a second tube 75 leads to the air coupling on bellows 22. This latter bellows needs only a single outlet on its coupling and, if a coupling similar to 69 is employed, one branch will be sealed off. Nipple 66 is received in the bore 70 of coupling 69, and the latter is bolted, as at 76, to a shoulder piece 77 which is attached to nipple 66 as by brazing, the connection being made air-tight by a gasket 78.

As stated above, there is no metering into or out of the air-oil bellows. For these bellows, a fitting 48' having a housing generally similar to the housing of valve 48 is employed. As shown in detail in Fig. 12, this fitting comprises a short tube 79 having an inner flange 81 engaging behind the portion 65 of partition 23, securing the latter in place in the bellows in fluid-sealing relation. The flange 81 is brought into tight clamping engagement by means of a ring nut, indicated generally at 82, which is threadedly engaged on the outer end of tube 79. Pressure of the nut 82 is communicated through the shoulder 83 of a washer sleeve 84, which shoulder dwells on the outer face of plate 44. The nut 82 comprises a ring portion 86, a diametral bridge portion 87, and an axial bolt portion 88. Cup member 52 surrounds the nut and an axially directed flange 89 on the sleeve 84. Nut 54 threaded on bolt 88 secures the cup 52 in place through a fluid-sealing gasket 56. Attachment of oil tubes 47 to the cup 52 is the same as in the case of valve 48.

Referring to Fig. 5, the extensions 36 carrying the two front bellows comprise a pair of tubes 91, each having a flattened end 92 bolted to the T-ring 46 as at 93 and extending beyond the T-ring. A flanged, channel section 94, welded to the container section 3, is of proper length to fit between the extended ends of flat portions 92, to prevent skewing of rods 91, and a pair of shorter channel sections 96, carried by container section 2, furnish a guide for insertion of the extension into the container section 2. The outer ends of tubes 91 are bevel-faced as at 97 and are insertable in a pair of arched portions 98 on a strap 99 welded to container section 2. In addition to the bracing members in the container, the extension 36 carries its own bracing in a cross plate 101 and a pair of diagonal tubes 102, bolted to the T-ring 46 and welded to tubes 91. The plates 101 serve also as a mounting for the front bellows.

The two front bellows are carried between the extension frames 36 and the ring 32. In this auxiliary system the bellows are inverted from the position occupied by the bellows in the main suspension. Thus, in Fig. 11, which shows the air-oil bellows in enlarged detail, the plate 37 is bolted to the cross plate 101 and the T-strap 45 of plate 44 is bolted to a plate 103 welded to a split housing 104 of a ball and socket joint. The housing 104 is fastened to the ring 32 by bolts 106 and also to a bracket 107 on the ring 32 by bolts 108. An oil pipe 47' connects the oil outlet 48', similar to that shown in Fig. 12, with the metering valve 48 of oil bellows 33, and an air tube 109 is connected to an inflation valve in air valve housing 74 and to a single-outlet nipple 111 carried by plate 37 of bellows 34 and communicating with the air chamber therein.

The connecting means between the front bellows and the engine 19 comprises, in each case, a rod with a ball on each end. These, of course, will vary in dimensions depending upon the size and shape of the engine 19. As shown in Figs. 2 and 4, a long rod 112 has a ball 113 nested in a spherical socket comprised by the two halves of housing 109 associated with bellows 33 and has a ball 114 bolted within a two-part housing 115, one part of which is carried by the engine 19. The connection from bellows 34 is similar to that from bellows 33 except that the rod 112' is shorter and stouter.

In order to ensure that rods 112, 112' remain perpendicularly disposed to the inner plates of front bellows 33, 34, as the engine is displaced longitudinally of the container, there are provided Y bars having diverging arms 116, 117 (Figs. 1 and 2) pivoted by pins 118 to brackets 119 attached to the leftward ring 24 of the main suspension, and having an extension 120 at the apex of arms 116, 117 pivoted by a pin 121 to a bracket 122 attached to the housing 109 (or 109') of the ball socket joint.

Figure 14:
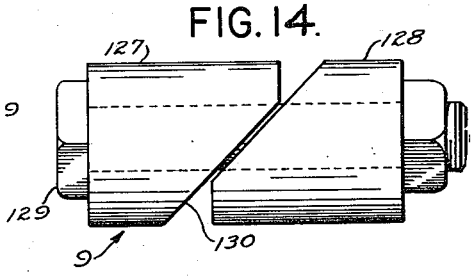
Fig. 14 is a bottom view of Fig. 13.

The manner of joining the main sections 2 and 3 of the container will be apparent from Figs. 8 and 14. The inner rims of the sections 2, 3 are turned as at 123 through a loop of about 270°, more or less, to enclose a reenforcing tubular metal bead 124. The cross arms 125 of T-ring 46 engage the inner surface of the container behind the respective loops 123, and the leg 126 of the T extends outwardly of the container and provides an abutment against which the reenforced loops 123 are drawn. Securement of loops 123 in tightly abutting relation to leg 126 of the T is effected by means of oppositely disposed pairs of clamp lugs 127, 128, each pair having aligned bores for accommodation of a bolt 129 by means of which the lugs are drawn together. The sides 130 of the lugs are diagonally inclined so as to provide for dwell of the lugs on the T-ring throughout the tightening process. Positive lodgment of the lugs is accomplished by means of hooked portions 131 engaging behind the terminal free edge of the rolled rim 123. The lugs are interchangeable, one lug, bolt and nut size serving all types and sizes of engine containers. The clamp assembly is of minimum height, thus keeping overall diameter to a minimum and providing more ground clearance when the container is rolled. A 9/16 inch bolt is used in order to reduce the required number of clamps to a practical minimum.

Air-sealing of the container at the T-ring joint is accomplished by means of a pair of O-rings 136. The latter engage the rims 123 at about the 45° position of their fold, and also engage annular grooves 137 of arcuate section located in the corners of the T-ring 46 between the respective arms and the leg thereof. With this arrangement it will be seen that the O-rings are deformed to an extent sufficient to provide a hermetic seal when the lugs are drawn up, but that this deformation reaches a maximum possible value when the rolled, beaded rims 123 contact the leg of the T, the stresses thereafter being communicated entirely to the T-ring. This obviates punishment to the O-rings, lengthens their useful life, and provides a certain, secure and uniform seal. It should be noted also that use of these O-rings is made feasible, in part, by the fact that lugs 127, 128 distribute the bolting load on the rolled edge 123 of the shell and thus reduce bending stresses on the bolt.

The engine 19, rings 24, extensions 36, front ring 32, the various bellows and their fluid and air connections, and the T-ring 46 form a sub-assembly comprising a unit insertable into container section 2, or over which the container section 3 may be drawn (see Fig. 1). Thereafter container section 3 is brought into position covering the rear end of the engine. When the two rolled rims 123 are in close proximity to T-ring 46, the lugs are applied and drawn up to effect jointure and air-sealing of container sections 2, 3.

The oil supply, as to amount, is fixed in the bellows prior to insertion of the sub-assembly and thereafter there is merely a shifting of the relative amounts among the various bellows as determined by dynamic forces encountered. The air pressure, however, may need to be varied or renewed, and for this purpose the air valve housing 74 is accessible from the outside of the container.

With the container loaded, the engine 19 is freely suspended on the various bellows with the main load carried through the trunnions 31, rings 24, bellows 21, and 22 and T-ring 46. It is worthy of note in this regard that the T-ring not only serves as an efficient coupling member providing ease of assembly and a uniquely effective seal, but that it also furnishes a region of great strength and solidity for supporting the main load.

Under static conditions the load is transmitted to the container through those bellows lying below a horizontal diameter, the distribution being such that the bellows at or near the bottom carry the greatest portion while those near the horizontal diameter carry the least. In order to describe the functioning of the suspension, it will be helpful to visualize the system as simply comprising one oil bellows at the bottom and one at the top, and an air-oil bellows or accumulator at some other point in the system. Since the oil in the air-oil bellows, or accumulator, is in communication with the oil in the other two bellows, the amount of air pressure in the accumulator will determine the static pressure in the air-oil bellows. A static load placed within the suspension will result in a depression of the lower bellows and an extension of the upper bellows due to displacement of oil from the depressed bellows through port 64 of valve head 60, or around its edges, or both.

It is well known in the art of bellows-type springs that the load is transmitted across an effective area whose terminal limits lie intermediate the outermost periphery of the bellows and a circle at the points of tangency of the bellows wall with the rolled rims of the end plates. This area is defined by the circle of approximate radius $a$, for instance, shown in Fig. 8. Let this effective radius be called $b$ in the case of the upper bellows. As the lower bellows is depressed, its overall diameter will increase and the point of tangency of wall 39 with folded rim 41 will move outward from the center of the bellows. Thus, the value of the effective radius $a$ will be increased. Conversely, the value of $b$ will decrease, since the inner plates of the bellows are interconnected through the suspension rings. If an article of weight W is placed in the suspension, between the bellows, they will deform as above stated until the difference in the total pressures on the effective areas of the respective bellows becomes equal to the applied weight. That is, $$P\pi(a^2-b^2)=W$$

where P is the unit pressure in the system. This pressure remains the same except for transient conditions under dynamic loading wherein inertia of the oil and flow resistance in the conduits and valves is a factor, and wherein the pressures in the oil bellows will attain high values prior to operation of the metering valves.

For the case shown in Fig. 3, with more than two bellows distributed around the rings, the load transmission will, of course, be divided among the several bellows on the lower half of the suspension, with the lowermost bellows being deformed largely or entirely by direct depression or flattening, and the others deforming partly in depression and partly by skewing angularly to their axes. The respective counterparts of these bellows in the upper half will deform in converse manner, but due to the incipient pressure in the system will never attain a negative pressure, or what may be termed a tension in this type of spring.

As volume change differentials occur between the bellows with fluctuation of $a$ and $b$, the air-oil bellows operates in its alternative function as an accumulator to receive the excess, either under static or dynamic conditions. It is also operative in this sense upon changes of pressure due to temperature variations.

The foregoing discussion has to do with static conditions. That is, the weight is applied, the bellows deformed, and fluid redistributed during a comparatively long time interval, so that there is no great build-up of pressure in the bellows, the system finally stabilizing with appropriate values of effective radii such as $a$ and $b$. However, under dynamic loading as where the container is dropped in a manner to produce a force equal to 15 times the force of gravity, the leakage in the metering device will be insufficient to accomodate the tendency of the oil to flow outward, and the pressure in the bellows therefore rises to a high value during an appreciable time interval, until it is sufficient to overcome the valve spring. Meanwhile the shock will have been dissipated to a minor extent due to compressibility of the oil and to stretching of the bellows wall. While these latter effects are minor, they are not inconsiderable. After the built-up pressure has attained a value sufficient to overcome the metering valve spring, and fluid readjustment proceeds, limited only by the flow coefficient in the valve orifices and in the pipes, the weight W assumes a temporary displacement relative to the container. This delayed displacement is considerably minimized with the system of the present invention, being limited to a maximum of 2 inches for a heavy aircraft engine under a force fifteen times the force of gravity.

The characteristics of the suspension of the invention are shown in Figs. 26 to 28, in comparison with those of other types of springs. In these graphs the ordinates are gravity units, G, and the abscissae are displacements, in inches.

In Fig. 26, curve $a$ is for an all-air spring, curve $b$ for an all-rubber spring, curve $c$ for a metal coil spring, and curve $d$ for an air-oil metered spring. All curves in this figure are plotted to a total positive load movement of 2 inches. The area under each curve represents the work done in deforming the spring, or energy-storage capacity, authoritatively recognized as a figure which adequately defines the efficiency of any spring. It will be seen that the air spring, using air pressure only, has very "soft" characteristics; that is, relatively large displacement changes for small load changes, especially in the middle portion of its load cycle. It will be noted that this type of spring is not adapted for dynamic loading in any considerable magnitude for minimized displacements, the 2 inch permissible maximum being attained at a load value of about 4 G. Otherwise stated, the spring will not absorb all of the energy resulting from a force of 15 G within the permissible 2 inch movement. Although curve $b$ shows considerably more efficiency and curve $c$ shows 50% efficiency, they still fall short of requirements. The air-oil system, however, as seen from curve $d$ has about 80% efficiency and meets the requirements satisfactorily.

Considering curve $c$ for the metal spring, the next most efficient, a somewhat more enlightening comparison with the behavior of the air-oil spring is presented in Figs. 27 and 28. If it were desired to employ a steel coil spring to provide an absorption of energy equal to that provided by the air-oil spring under similar conditions of maximum loading and displacement, as indicated by an area under the load-displacement curve equal to that of the air-oil spring (Fig. 27), it would be necessary to have the coil spring in a pre-compressed condition at the position of zero deflection; that is, zero movement of the suspended mass. In other words, the load will be in excess of 6 G before any displacement of the suspended mass occurs. Such a condition would deprive the system of all "soft" cushioning which is necessary to protect the suspended article from the effects of repeated, minor shocks, which might result in damage such as "false Brinelling" of delicate precision bearings.

In Fig. 28, the curve $c^2$ is shown for a coil spring in which an energy absorption capacity equal to that of the air-oil spring is attained by "stiffening" the spring. However, the G valve at the maximum deflection of 2 inches becomes 24. This maximum G value submits the engine to much higher shock loads than the 15 G resulting from the air-oil combination spring.

In use under static conditions, the characteristics $a$, Fig. 26, are manifest. Under maximum impact, characteristics $d$ predominate. With lesser impact, intermediate characteristics result, and all manner of characteristics are possible between the limits defined by curves $a$ and $d$.

The accessory case

The accessory case, shown generally at 138 in Fig. 2, is carried in an opening in the container in hermetically sealed relation. One of the main functions of the accessory case is to carry a desiccant for maintaining a dry atmosphere within the sealed container. It also serves to compactly house miscellaneous items pertinent to the packaging, such as documents containing engine records. By the use of such a unit, the number of sealed openings in the container is reduced and the chances of leakage thus minimized.

The accessory case is shown generally at 138 in Fig. 2 and, in enlarged detail, in Figs. 16 to 20. In overall aspect the case is oblong in section and includes a desiccant container 139 of elliptical section with an attached cylindrical extension 141, and having perforations 142 throughout. The case is assembled by means of a pair of through bolts 143 engaging an inner cap 144 and a sturdy outer plate 145. The latter retains, as by annular grooves 146, a cylindrical container 147 which when the plate 145 is assembled, abuts the outer face 148 of the elliptical portion of case 139 and lies alongside the cylindrical section 141.

The thus assembled container is inserted through a sleeve 149 of oblong sectional profile which is welded in a corresponding opening in the container section 2 in air-tight relation therewith. The sleeve 149 has an outer flared rim 151 accommodating an O-ring 152, and the outer plate 145 is provided with a rabbeted portion 153 receiving the O-ring to seal the opening, defined by sleeve 149 against the atmosphere. Plate 145 is secured on the sleeve 149 by means of four corner bolts 154 engaging with brackets 156 on the sleeve. Container 147, which serves to hold engine records and the like, has a bead 157 of resilient material on its outer rim, on which a hermetic seal is effected by means of a dished cover 158 having extending lugs 159 with anchored nuts 161 engaging with extensions of bolts 154 whereby it is drawn down onto the bead 157. The desiccant, which may be silica gel, is contained in small bags 162 carried in container 139 and its extension 141, the latter having a cover 163. A humidity indicator 164 is carried in air-sealing relation adjacent an opening 166 in plate 145 and the cover 163 is held in spaced relation to the opening 166 by dents 167 formed outwardly of the cover.

As seen in Fig. 20, the cover plate 145 includes an inflation valve 168 and a relief valve 169. The inflation valve is conventional and comprises a cover cap 171, insides 172, and a threaded plug 173 screwed into the plate 145 and communicating with manifold ports 174 in a plug 176 threadedly held in plate 145 in coaxial relation to plug 173. The interior of container 1 is pressurized through valve 168 to the desired extent, preferably 5 pounds per square inch. After this pressure is reached, any further charging will result in the operation of relief valve 169 to permit escape of excess air.

Figure 15:
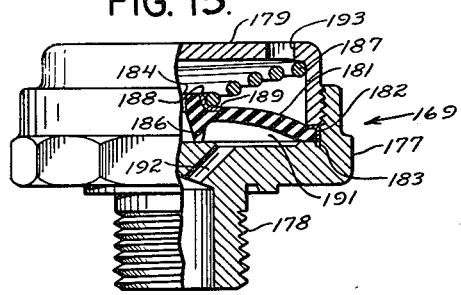
Fig. 15 is an enlarged view of a relief valve partly in section.

The relief valve is shown in detail in Fig. 15. A cup shaped member 177 has a reduced axial tubular shank 178, threaded for insertion in plate 145 in communicating relation to a ported plug 176' identical with plug 176. Cup member 177 is internally threaded to receive a cover 179 which serves to secure a rubber diaphragm 181 by pressure on a ring 182 of L section which engages the periphery of the diaphragm. An annular groove 183 in the floor of the cup member 177 provides clearance for travel of the ring 182 during the tightening of the diaphragm. The diaphragm is dome shaped, with a central opening 184 extending into a downwardly directed tubular flange 186 which is urged against the central portion of the floor of cup member 177 by a conical coil spring 187 compressed between cover 179 and around an upward extension 188 of flange 186, with a reinforcing metal ring 189 around extension 188 forming a seat for the spring.

At values of the pressure in the tube 178 (that is, in the container 1), below the maximum for which the valve is designed, the flange 186 contacts the floor of cup member 177, thus defining a chamber 191 which is in communication with tube 178 through a plurality of slanted ports 192. The internal pressure is thus at all times exerted on the underside of diaphragm 181 and is maintained by engagement of flange 186 with the floor of cup member 177 under the urging of spring 187. When the pressure exceeds the predetermined maximum, the flange 186 will be lifted from its seat and the excess air will pass through opening 184 of the diaphragm and thence through openings 193 in the cover 179.

The relief valve 169 has no sliding, metal-to-metal surfaces and, therefore, is free of troubles consequent upon friction and corrosion, and the rubber-to-metal seat of flange 186 is efficient in its leak-proofness and self-adjusting upon wear or change of size or shape from any cause. Furthermore, the combination of large pressure area on the underside of the diaphragm with low valve seat area provides good damping characteristics and eliminates flutter.

Figure 29:
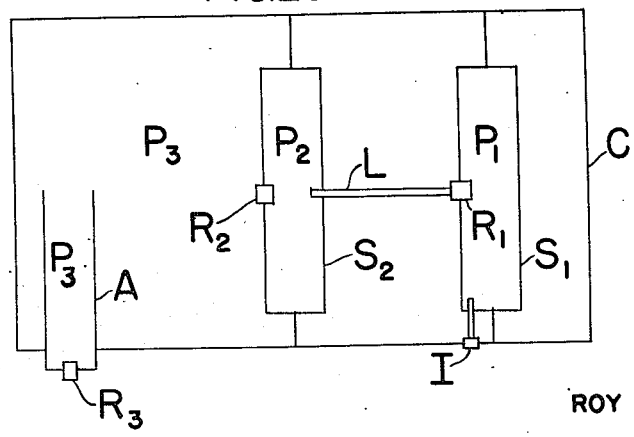
Fig. 29 is a diagrammatic view showing a modified pressurizing system.

The system shown in Fig. 2 has three inflation valves, one each for the main and auxiliary suspensions, these being contained in housing 74, and the valve 168 for the container, carried on the accessory case 138. However, by the system shown schematically in Fig. 29, only one inflation valve is required. This may be termed a "pressure cascade" system in which communication is had from high to low levels through the medium of a series of relief valves. In the figure, C represents the container as a whole, $S_1$ the total air chamber capacity of one suspension system, $S_2$ that of a second suspension system, and $P_3$, $P_1$ and $P_2$ their intended maximum pressures. An inflation valve I is in communication with $S_1$. The latter is in communication with $S_2$ through a relief valve $R_1$ and a line L, and $S_2$ vents to the interior of container C through a relief valve $R_2$. The final venting stage is accomplished through a relief valve $R_3$ carried by the accessory case A. Valve $R_1$ is set to maintain pressure in system $S_1$ at a value at or below $P_1$; similarly, $R_2$ keeps the pressure at or below $P_2$ in system $S_2$, and, case A being in free communication with the interior of container 1, valve $R_3$, venting to the atmosphere, keeps the pressure in the container at or below a value $P_3$. Obviously, the valve $R_3$ could be carried on the container shell itself instead of on the accessory case.

Figure 21:
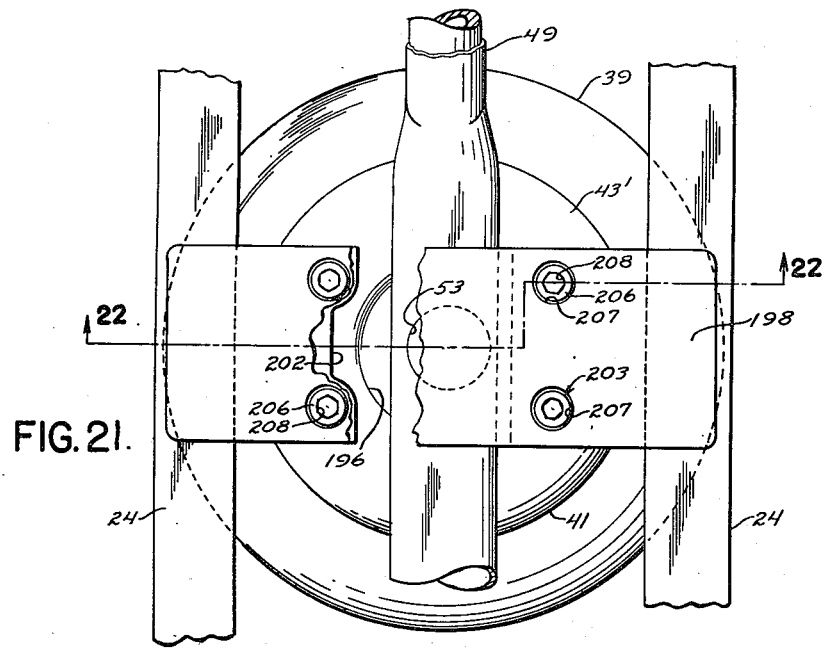
Fig. 21 is a view similar to Fig. 6 showing a modified bellows and mounting.
Figure 22:
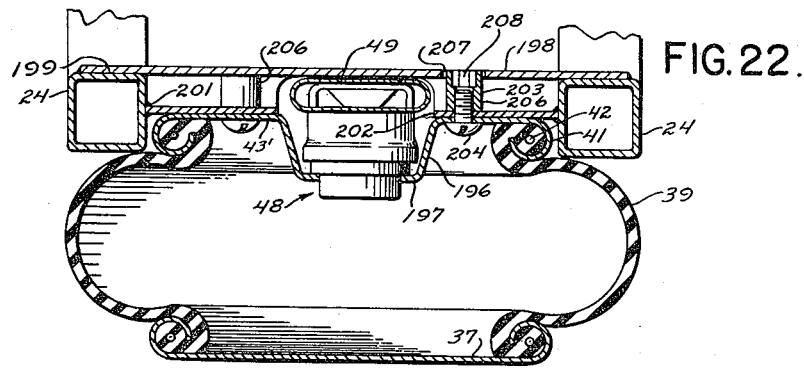
Fig. 22 is a sectional view taken on the line 22—22 of Fig. 21.

A modified mounting for the bellows of the main suspension is illustrated in Figs. 21 and 22. The principal differences from the mounting shown in Fig. 8 are that the oil lines and metering valves are located on the inner sides of the bellows, the metering valves are centered on the bellows faces and the bellows faces are carried flatly on their mountings and furnish symmetric load transmission about their axes. The wall of the bellows 39 is the same as in Fig. 6, as is the flat plate 37. However, the latter is turned outwardly and fastened to the T-ring 46. The opposite end face 43' of the bellows has a central, inwardly directed well 196 with a flat bottom 197 having a central circular opening to receive the metering valve 48, the latter being brazed to the well bottom 197.

The cross-piece 198 which supports the inner face plate of the bellows is a hollow, relatively wide member with a depth about half that of rings 24, and is cut away on the outer side at each end so that its inner wall dwells on the inside of rings 24 as at 199 and the cut end of its outer wall abuts the adjacent side faces of the rings, as at 201, all ends being welded to the rings as shown. The cross-piece 198 is cut away as at 202 to accommodate the metering valve 48 and the oil piping 49. The resultant weakening of the structure of cross-piece 198 is compensated by the end plate 43' of the bellows, which is securely fastened to the inner wall of member 198 by fastening devices 203. The latter consist of bolts 204 threaded into a tubular nut 206 received through an opening 207 in the inner face of member 198. Nut 206 has a hexagonal opening 208 for reception of an Allen wrench, and plate 43' and the inner face of cross member 198 are secured between nut 206 and the head of bolt 204. This arrangement eliminates protruding parts inwardly of rings 24.

Figure 23:
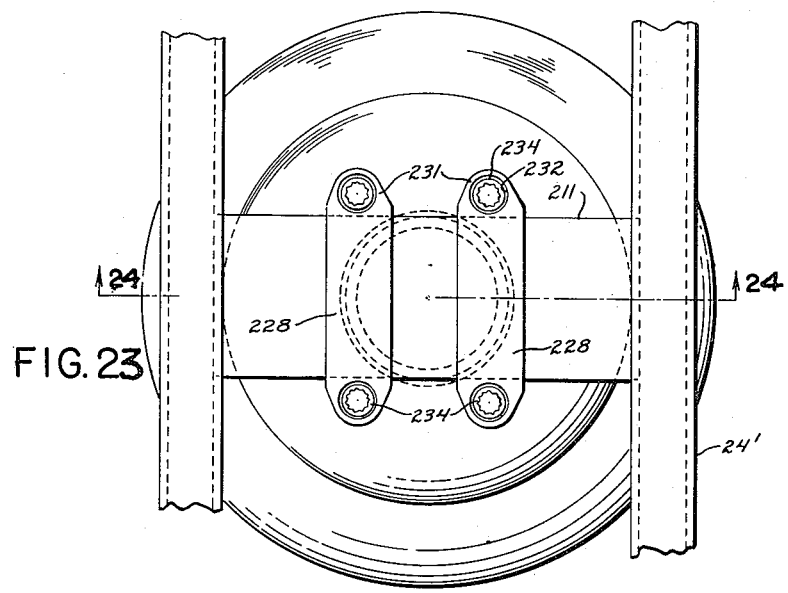
Fig. 23 is a view similar to Fig. 21 showing a still further modified bellows and suspension.
Figure 24:
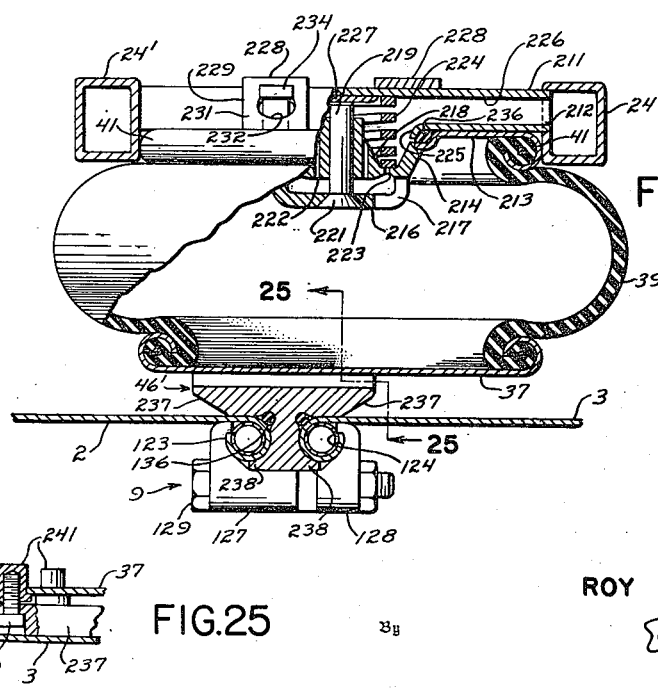
Fig. 24 is a sectional view taken on the line 24—24 of Fig. 23.
Figure 25:
Fig. 25 is a section taken on the line 25—25 of Fig. 24.

The bellows modification of Figs. 23, 24 differs from the one just described in that the cross-pieces and suspension rings are utilized for hydraulic communication between the bellows, and the bellows plate and cross-piece coact to form a housing for the metering valve parts.

The cross-piece 211 is generally similar in section to cross-piece 198, but its end faces are not cut away and they extend through and are brazed or welded to openings 212 in the adjacent faces of rings 24' which are somewhat oblong in cross-section with their longer dimension in the radial direction. The inner plate 213 of the bellows has a central, inwardly directed well 214 with a flat bottom 216 and a series of ports 217. The valve head 218 is slidingly carried on a stem 219 having a beveled head 221 fixed in a central opening in the well floor 216. As in the case of valve 48, the valve head 218 is ported as at 222 and is spaced from the inner flange 223 of well 214. A spring 224 is contained within an opening 225 of the cross-piece 211 and its outermost convolution straddles the clearance between the valve head 218 and well flange 223 and is under compression, with its innermost convolution abutting the inner wall 226 of cross-piece 211 and held in position by an inward depression 227 in the inner plate of cross-piece 211.

Attachment of the bellows to the cross-piece 211 is effected by means of pairs of straps 228. Each of the latter extends across the inner face of the cross-piece 211 and has integral end lugs 229 extending from the strap a distance equal to the depth of cross-piece 211. Lugs 229 have slant faces 231, are bored as at 232, and counterbored as at 233 to accommodate a bolting unit 234 similar to unit 203 previously described. Unit 234 secures the bellows plate 213 to the outer face of cross-piece 211 with the well 214 aligned with opening 225 thereof, a fluid-sealing O-ring 236 being compressed between a flange at the opening 225 and a shoulder at the rim of well 214.

The operation of the metering valve is the same as that described for the Fig. 8 modification.

A modified T-ring 46' is also shown in Fig. 24. Here the arms of the T are beveled as at 237, and the foot of the T is widened as at 238. The beveled edges of this T-ring are of considerable importance in the operation of assembling the container sections 2 and 3, since they form a guide for the juxtaposed ends of the said section and serve, together with rolled edge 123 of the shell, to bring them readily up to position on the T-ring, even though the sections be somewhat out of round.

The enlarged foot of T-ring 46' serves to improve the torsional rigidity thereof. Also, the widened foot provides more area for dwell of the lugs 127, 128.

The bellows are fastened to the T-ring by means of four bolts 239, the heads of which are received in counterbores in the arms of the T-ring so as not to protrude beyond the outer surfaces thereof. Nuts 241 having a blind, outwardly directed threaded bore are securely fastened in openings in outer plate 37 of the bellows and serve to receive the bolts 239, the nuts having outer, spacing flanges 242 with an outer edge appropriately slanted to engage the curved, inner face of the T-ring.

While certain embodiments have been shown, it will be understood that these are presented for purposes of illustration, and that other modifications are possible, and various changes in the exact size, shape and arrangement of the parts, for instance, may be made without departing from the spirit or scope of the appended claims.

What is claimed is:

1. An enclosing container for heavy articles comprising, an outer shell composed of separable end sections, an inner, suspending medium for a contained article, shock-absorbing units fixed to said medium, a ring of generally T-section surrounding said units, said units being attached to the cross arm of the T-ring, the foot of said T-ring extending between the adjacent rims of said separable end sections, and means locking the said rims of said end sections against opposite sides of the foot of said T-ring.

2. A container comprising, a shell having separable end sections with adjacent rim portions rolled to form a bead, a ring-shaped suspending medium for articles within the container, a plurality of bellows attached at spaced points around the said suspending medium, a band surrounding and attached to said bellows, a radial flange extending from said band and outwardly of said beads, clamp means urging said beads against the opposite faces of said flange, and gasket means contacting the band, flange and beads.

3. A container as in claim 2, said bellows containing a hydraulic medium in intercommunication, means to meter outflow of said medium from the bellows under dynamic loading, said shell having an accessory case extending through the wall thereof and fixed to the wall in air-tight relation, and closure means for said accessory case operable from without the container.

4. A container comprising, a shell having separable end sections with adjacent rim portions rolled to form a bead, a ring-shaped suspending medium for articles within the container, a plurality of flexible containers containing a hydraulic medium in intercommunication attached at spaced points around said suspending medium, means to meter outflow of said hydraulic medium from the flexible container under dynamic loading, a band surrounding and attached to said flexible containers, a radial flange extending from said band and outwardly of said beads, clamp means urging said beads against the opposite faces of said flange, gasket means contacting the band, flange, and beads, said shell having an accessory case extending through the wall thereof and fixed to the wall in air-tight relation, and closure means for said accessory case operable from without the container.

References Cited in the file of this patent

UNITED STATES PATENTS

| | | |
|---|---|---|
| 1,107,339 | Milliron | Aug. 18, 1914 |
| 1,130,354 | Uttz | Mar. 2, 1915 |
| 1,457,496 | Butler | June 5, 1923 |
| 1,911,125 | Miller | May 23, 1933 |
| 1,915,303 | Forsyth | June 27, 1933 |
| 2,038,968 | Summers | Apr. 28, 1936 |
| 2,093,486 | Schoepf et al. | Sept. 21, 1937 |
| 2,147,990 | Richter | Feb. 21, 1939 |
| 2,271,260 | Horsley | Jan. 27, 1942 |
| 2,300,259 | Kueppers | Oct. 27, 1942 |
| 2,356,093 | Sampietra et al. | Aug. 15, 1944 |
| 2,366,741 | Manson et al. | Jan. 9, 1945 |
| 2,404,819 | White | July 30, 1946 |
| 2,469,156 | Cargill | May 3, 1949 |
| 2,481,150 | Pifer et al. | Sept. 6, 1949 |
| 2,549,906 | Johansson | Apr. 24, 1951 |
| 2,594,586 | Ries | Apr. 29, 1952 |